S. WILCOX.

HOT AIR ENGINE.

No. 10,529. Reissued Oct. 7, 1884.

Witnesses:-
Louis M. Whitehead.
J. E. Rennie

Inventor:-
Stephen Wilcox
— by his Attorney —
T. D. Stetson

S. WILCOX.

HOT AIR ENGINE.

No. 10,529. Reissued Oct. 7, 1884.

*Witnesses:-*
Louis H. S. Whitehead.
J. E. Renwee.

*Inventor:-*
Stephen Wilcox
*by his Attorney:-*
Thomas S. Stetson.

S. WILCOX.

HOT AIR ENGINE.

No. 10,529. Reissued Oct. 7, 1884.

*Witnesses:-*

Louis M. Whitehead.

J. E. Rowe.

*Inventor:-*

Stephen Wilcox

*by his Attorney:-*

Thomas S. Stetson

S. WILCOX.

HOT AIR ENGINE.

No. 10,529. Reissued Oct. 7, 1884.

Witnesses:-

Louis M. Whitehead.

J. E. Rennee

Inventor:-

Stephen Wilcox by his Attorney:-

Thomas D. Stetson

UNITED STATES PATENT OFFICE.

STEPHEN WILCOX, OF BROOKLYN, NEW YORK.

HOT-AIR ENGINE.

SPECIFICATION forming part of Reissued Letters Patent No. 10,529, dated October 7, 1884.

Original No. 289,481, dated December 4, 1883. Application for reissue filed March 24, 1884.

*To all whom it may concern:*

Be it known that I, STEPHEN WILCOX, of Brooklyn, Kings county, in the State of New York, have invented certain new and useful Improvements in Hot-Air Engines, of which the following is a specification.

I employ a cooling-jacket in connection with the regenerator, both arranged around the changing-cylinder, by which the zones of low temperature are kept low in the regenerator, and the water cools not only the air which moves to and from the cool end of that cylinder, but also cools the cylinder itself. The engine is automatically regulated by a governor, which shifts a link, and this in turn moves the changing-pistons. I provide peculiarly-adapted packing around the piston-rods, and force air into the pipe connecting the tops of two opposite working-cylinders to compensate for leakage. By regulating this action automatically a uniform pressure is maintained. I have devised means for subtracting a large portion of the heat from the gases discharged from the furnace and for imparting it to the incoming air. A blower promotes the draft sufficiently to overcome the resistance due to these provisions. I have also devised means for distributing oil in the upper portion of each annular cylinder. The engine has two furnaces, fired independently, and two working-cylinders, the upper ends of which are connected by an ample pipe. Their pistons are joined by a vibrating beam, so that the moving parts in each balance each other. Concentric with and outside the working-cylinders are placed two changing-cylinders, the pistons of which are also connected to a beam. Two such pairs, or any other number of pairs, may be united to act on one shaft. I will describe one pair only.

The following is a description of what I consider the best means of carrying out the invention.

The accompanying drawings form a part of this specification.

Figure 1:
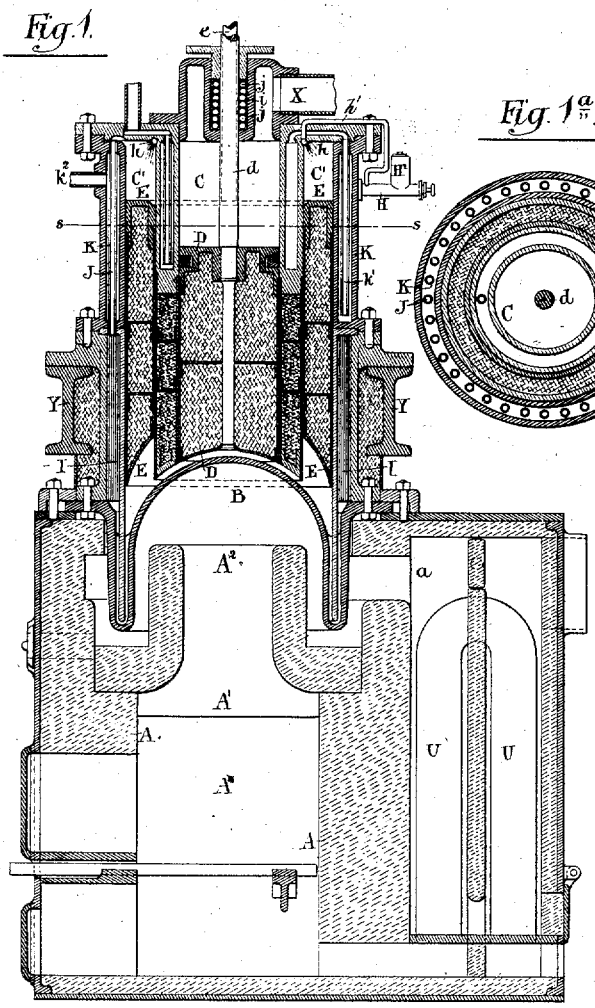
Figure 1A:
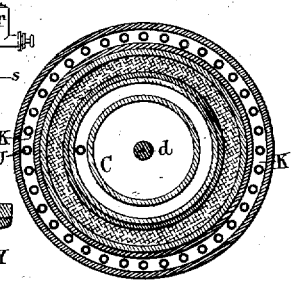
Figures 2, 2A:
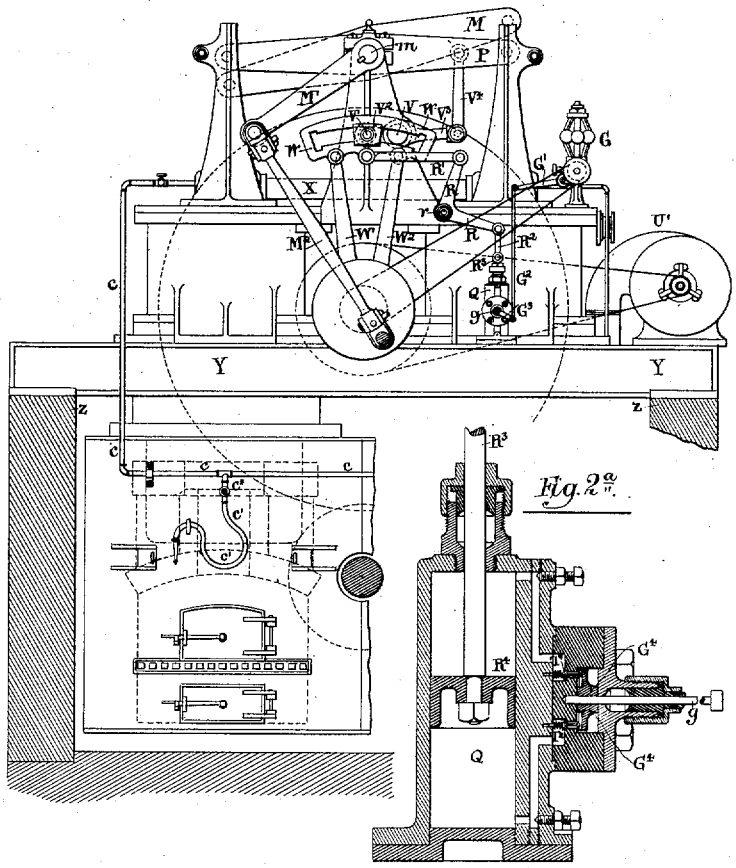
Figure 3:
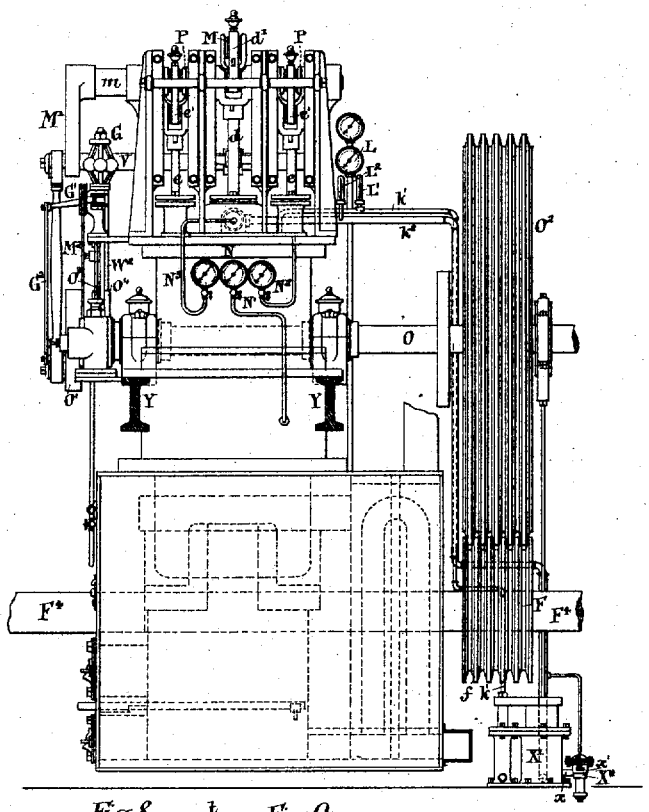
Figure 8:
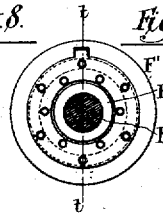
Figure 9:
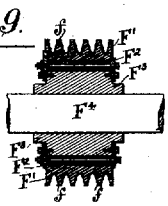
Figure 4:
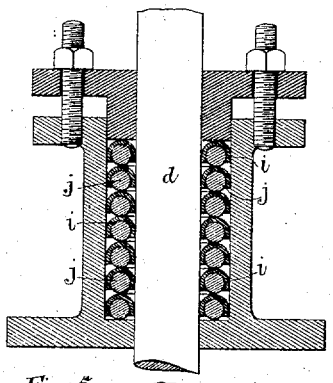
Figure 7:
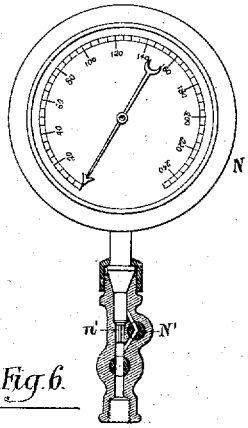
Figure 5:
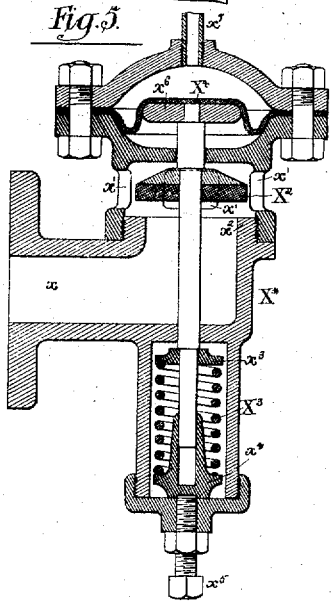
Figure 6:
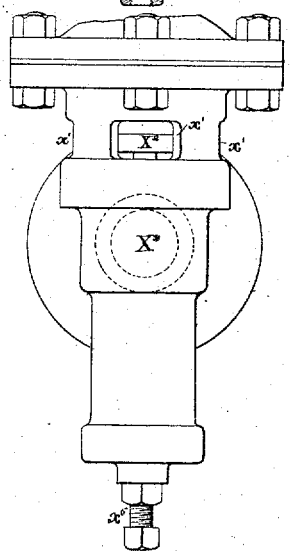

Figure 1 is a central vertical section through one of the cylinders and immediately connected parts. Fig. $1^a$ is a horizontal section on the line *s s* in Fig. 1. Fig. 2 is an elevation, partly in section. Fig. $2^a$ is on a larger scale. It is a vertical section through the regulating-chamber for the automatic link adjustment. Fig. 3 is an elevation at right angles to that shown in Fig. 2. The remaining figures are on a larger scale. Fig. 4 is a vertical section through one of the stuffing-boxes. Fig. 5 is a vertical section through the device for automatically controlling the air-pump, and Fig. 6 is an elevation of the same. Fig. 7 is a section, partly in elevation, showing the provisions for indicating the highest pressure. Fig. 8 is an elevation of the friction-pinion or jack-wheel. Fig. 9 is a section of the same on the line *t t* in Fig. 8.

Similar letters of reference indicate corresponding parts in all the figures where they occur.

A is the brick-work of a furnace, A*.

A′ is an arch, and $A^2$ a short funnel.

B is the heater, the central part of which is dome-shaped.

C is the working-cylinder.

D is the working-piston, and *d* the piston-rod.

E is the annular changing-piston working in a cylinder, C′, larger than the working-cylinder and placed concentric thereto. Both pistons are of considerable depth. The changing-piston simply performs the function of shifting the air alternately from the cold to the hot portion of the apparatus and back again. Each working-piston rod *d* is connected by a link, *d′*, to one end of a working-beam, M, which is keyed onto a strong rocking shaft, *m*, having a crank-arm, M′, and mounted in fixed bearings. The two working-pistons and their connections balance each other. The connecting-rod $M^2$ extends from a pin on the crank-arm M′ to a pin in the crank O′ on the crank shaft O.

Eccentrics $O^3$ $O^4$ connect by eccentric-rods W′ $W^2$ to a Stevenson link, W, which takes hold of a link-block, $V^2$, which is mounted on a pin, V′, carried on an arm fixed on a rocking shaft, V, supported in bearings in the framing. This shaft V has two arms, $V^3$, (only one of which is shown,) which carry, respectively, links $V^4$, (only one of which is shown,) connecting the arms to the changing-beams P, and by them operate the changing-pistons E. The two changing-pistons, connected to opposite ends of the changing-beams by rods $e$ and links $e'$, balance each other. The link W has to overcome only the inertia and slight friction of the changing-pistons and the slight resistance of the air which the changing-pistons cause to be transferred rapidly between the hot and cold portions of the apparatus. The power is produced by the changes of temperature, and consequently of pressure, that follow such transference, as will be readily understood.

I is a regenerator composed of metallic plates set on edge and held a little distance apart. It is mounted in an annular space exterior to the changing-cylinder and in communication with the hot-air space, below the two pistons, and also through a cooler above, with the relatively cold air-space above the changing-piston. The space above the working-piston is subject to a constant pressure from air pumped in, as will be fully explained further on.

K is the cooler. It is formed with thin metallic tubes J, allowing the air to flow up and down through them, and having cold water circulating in the spaces around them. The cooling-water enters through a pipe, $k'$, and after traversing this cooling-chamber, and also another which occupies an annular space between the working and changing cylinders, is discharged through a pipe, $k^2$. The air-tubes J of the cooler communicate through passages at the top with the annular space over the annular changing-piston. The traversing of the air between the top and bottom of the apparatus in a thin annular space around the changing-cylinder is of advantage in requiring but a short passage of small volume. The presence of the cooler insures that the upper edge of the regenerator, which is below it, shall be at a low temperature. The regenerator, with its several zones of temperature varying from the hottest at the bottom to the coolest at the top, is a well-known adjunct of hot-air engines. It absorbs heat from the air as the hot air rises and becomes heated thereby, its lower edge being heated the most. It imparts heat to the descending air and is itself cooled thereby, the upper edge being cooled the most. The zones of heat are carried low on the cylinder by this arrangement of cooler and regenerator. The ultimate effect is the confining of the heat in the cylinders and in all the parts to a limited domain at the base of the apparatus. The ascent and descent of the changing-piston through the longest possible distance causes all the inclosed air, excepting what is contained in the passages, to move from end to end of the apparatus alternately. This is the condition for the most effective working.

I have adapted my engine to work at a regular speed by providing an automatic regulation. It acts by controlling the motion of the changing-piston. By shifting the link W so that it receives and holds the block $V^2$ in one end of its curved slot, the changing-piston E receives sufficient motion to cause it to traverse to the fullest extent and shift all the air. When the link W is held in some intermediate position, it causes a shorter motion of the changing-piston. Under these conditions less air is transferred between the cool and hot ends of the apparatus alternately, smaller changes of pressure are produced, and less power is developed by the action of the air on the working-piston.

R′ is a link which connects the Stevenson link W with a bell-crank lever, R, turning on a fixed center, $r$. This lever R connects, by a link, $R^2$, and rod $R^3$, to a piston, $R^4$, in a small cylinder, Q. The eccentrics cause an angular motion in the link and a corresponding tendency to slip from end to end of its slot on the link-block. Through the connections R, R′, $R^2$, and $R^3$ this tendency is communicated to the piston $R^4$, and its direction is changed to vertical. The cylinder is provided with passages, arranged as shown, controlled by valves $T'$ $T^2$. When these valves are held open, the fluid—oil or some other analogous inelastic fluid filling both ends of the cylinder—is free to move from one end of the cylinder to the other. When they are closed no such motion can occur. The piston $R^4$, and consequently the link W, is held against any shifting. It tends to vibrate by the action of the eccentrics $O^3$ $O^4$, but does not shift to one side or the other. When, however, one of the valves $T'$ $T^2$ is held open, vibration of the piston in one direction is permitted by the flow of the liquid through the open valve, and it moves toward that end of the cylinder communicating with said valve, but its return is prevented. The governor controls the opening of these valves. This control by the governor is effected through a lever, G′, which is raised or lowered by the action of the governor. It is connected by the link $G^2$ to the lever $G^3$. This lever rocks the spindle $g$ and the rigidly-connected wheel $G^4$, and by means of face-cams formed on the latter forces open one or the other of the valves $T'$ $T^2$, one being released when the other is open—that is to say, when the lever G′ rises it turns the wheel $G^4$ into such a position that the uppermost valve, $T'$, is held open. Under these conditions the fluid may flow from above the piston $R^4$ around into the space below said piston, the lowermost valve, $T^2$, opening automatically against the force of its gentle spring. The piston $R^4$ rises, and, acting through the connections, shifts the link W to the left, and modifies the power developed by the engine; but when the lever G′ ascends it liberates the upper valve, $T'$, and allows it to shut, thus resisting any tendency of the oil to escape from above the piston into the space below. The same movement opens and holds open the lower valve, $T^2$, and allows the oil to flow away from below the piston and to come into the space above it. This causes the piston $R^4$ to sink, and shifts the link W to the right, thus again modifying the power.

The piston-rods $d$ $e$ are surrounded by a series of rings, $i$, of good leather, shaped by wetting and stretching to the form shown in Fig. 4. These must be carefully kiln-dried at a moderate heat, after which they will endure the heat without injury. The rings $j$ are of vulcanized india-rubber of circular section. The stuffing-boxes are deep, and contain a number of these leathers, each partially inclosing its ring of rubber. The whole being gently compressed by the gland causes a light pressure against the piston-rod $d$, and, becoming highly polished by the friction, reduces the leakage around the piston-rods to a very small amount, even if the pressure in the engine be as high as one hundred and fifty pounds per square inch. One hundred pounds per square inch I esteem the best pressure to maintain above the working-piston. The packing in each working-piston allows some of the air above it to move down past it whenever the pressure below it is lower.

X′ is a constantly-acting force-pump operated by the engine with a uniform stroke, and forcing into the spaces above the working-pistons a small uniform quantity of air at each revolution. The leakage is liable to vary, and the admission of air to the pump is varied accordingly.

X* is a casing, having a nozzle, $x$, bolted on the induction-aperture of the pump. There are apertures $x'$, through which the air is drawn in freely; but the passage therefrom to the pump is controlled by a peculiarly-mounted valve, $X^2$, having a long stem, and capable of closing tight upon a seat, $x^2$. It is held up and open by a coiled spring, $X^3$, acting between the collar $x^3$ and an adjustable abutment, $x^4$, controlled by a screw, $x^5$. On the upper end of the stem is a considerable button or disk, $x^6$, above which is a chamber connected by a pipe, $x^7$, with the connection X between the upper parts of the working-cylinders. So long as the pressure in the latter is sufficient, the valve $X^2$ is, by the pressure of the air on the diaphragm $X^4$, held down to its seat; but the moment the pressure becomes reduced by leakage the spring $X^3$ lifts the valve $X^2$ a little and allows the pump X′ to take in air and force it into the pipe X until the full pressure is restored, when it is again stopped by the refusal of the valve to rise. In practice the valve $X^2$ rises a little, and the pump takes a little air at each stroke. Changing the screw $x^5$ determines the amount of pressure to be maintained in X.

The air to support combustion in the furnace is received through inverted U-shaped pipes U. These pipes, being exposed to the hot gases escaping from the furnace through the passage $a$, warm the air within, so that the fresh air therefrom entering the furnace, by being partially heated, contributes to the efficiency of the fuel, and consequently to the economy of the engine; but the passage of the air through these U-shaped pipes is resisted by friction. So, also, is the passage of the escaping gases from the furnace resisted by the effort required to flow through the chamber obstructed by these pipes. The consequence is a tendency to retard the draft.

U′ is a blower driven by a belt from the engine, and forcing the air strongly in its entrance through the pipes U. The effect of this blower should be sufficient to overcome the resistance of the fresh air in moving through the interior of the pipes U, and also to overcome the resistance of the hot gases in escaping from the furnace through the obstructed flue or chamber in which the pipes U are mounted. The combination of the blower with the pipes secures both economy and efficiency.

The changing-piston, although it need not be packed and need not rub with much tightness against the cylinders, has large surfaces subject to friction, and parts are liable to rise to a high temperature under some conditions, which cannot be conveniently insured against. I provide peculiarly efficient means for introducing oil to lubricate the parts.

H is a single-acting hand-pump, provided with a reservoir, H′, to receive oil. It communicates by a small pipe, $h'$, with a perforated pipe, $h$, extending around in a recess provided in the top of the changing-cylinder. Its perforations are arranged to allow the ejection of the oil upon the annular changing piston and cylinder. It spreads thereon and lubricates both the outer and inner surfaces.

L′ is a thermometer, the sensitive portion of which is inserted in the pipe $k'$, through which cold water enters the cooler K. $L^2$ is another thermometer, having its sensitive portion correspondingly inserted in the pipe $k^2$, which conveys away the warm water from the cooler. An inspection of these two thermometers shows by direct comparison the changes of temperature produced in the water of the heater. When the difference of temperature is too small it indicates that too much water is admitted to the cooler, and by partially closing a controlling-cock (not shown) the quantity of water which traverses the cooler is lessened. This is important when, as is frequently the case, the quantity of cooling-water is small. When the difference of temperature shown by the two thermometers is unusually great, it shows that the water in the heater is allowed to become too much warmed, and consequently that the air is being too little cooled by the cooler. When this is observed, the attendant opens a cock (not shown) and allows the water to circulate through the cooler more freely.

L is a pyrometer, having its sensitive portion immersed in the hot gases filling the flue or chamber $a$. It has a dial mounted in position to be easily observed by the attendant. When he sees that the heat in the flue is too low, he opens the damper and quickens the blower, or otherwise quickens the fire in the furnace. When he observes that the temperature of the pyrometer is too high, he closes the damper or decreases the action of the blower, or both, and consequently allows the fire to become less active. The several furnaces have each a separate pyrometer.

N is a pressure-gage. Its interior is subject to the pressure within the cylinder. This pressure varies widely between its greatest and its least during any given revolution. It also varies considerably in its absolute pressure at the period of greatest pressure. When the working-piston is being driven upward in its cylinder, the gage indicates the pressure at its highest. It is provided with a valve, *n'*, opening freely upward to allow the pressure of oil or other fluids acted on by the air to pass upward freely. When, during another portion of the revolution, the pressure in the working-cylinder is greatly reduced, this pressure-gage does not show the corresponding diminution of pressure. The pressure does not diminish in the gage except by a very small amount, that is due to a slow movement of the contained air past a stop-cock, N', which communicates through small passages with the gage and with the source of pressure. At every revolution of the main shaft there is a period at which the high pressure is felt by the gage, the same being transmitted freely past the valve *n'*. The gage runs down a little in the intervals. It vibrates during each revolution between a point indicating the highest pressure which obtains in the cylinder and one representing only one pound per square inch, or thereabout, below such highest pressure.

$N^2$ is a pressure-gage working under opposite conditions. The valve is arranged to allow the air to escape freely from the pressure-gage $N^2$ at each lowering of the pressure, and to rise only slightly during the period of high pressure. An additional gage, $N^3$, is of the ordinary construction, and is connected to the space above the working-piston. It is subject to a nearly uniform pressure of air. The air in the upper end of one working-cylinder is transferred through the pipe X to the top of the opposite working-cylinder as the working-beam M vibrates, and the two working-pistons alternately ascend and descend. The power is transmitted from the engine through friction-gears peculiarly mounted. The fly-wheel $O^2$ is a large pulley having V-shaped grooves turned or otherwise produced in its periphery, adapted to transmit power by friction in the well-known manner.

F is a jack-wheel, certain portions being designated, when necessary, by additional letters of reference, as F' $F^2$. It has an iron periphery, F', carrying V-shaped beads *f*, corresponding to the grooves in the wheel $O^2$; but instead of the whole jack-wheel being rigid and mounted fixedly on the shaft $F^4$, an annular mass, $F^2$, of vulcanized india-rubber is mounted between the hub $F^3$ and the annular rim F', which by yielding avoids the trembling due to ordinary friction-gear. It also allows the shafts to be slightly out of their true positions without causing mischief. The false position is accommodated by the yielding of the rubber $F^2$.

I have shown in the drawings, Figs. 2 and 3, a flexible pipe, *c'*, of india-rubber or analogous material having a contracted nozzle at one end and connected at the other to an iron pipe, *c*, which connects with the top of the working-cylinder C. On opening the cock *c** a strong blast of air is ejected from the nozzle, which, on opening one of the slides *b* and directing the current into the aperture thus exposed, clears the ashes and the soot from the space around the base of the heater.

Y Y are girders which support the mechanism, resting on brick walls Z.

The concentric changing and working cylinders C and C' have one end, the lower end of each, opening directly into the heater. The head of the changing-cylinder is cast in one piece with the working-cylinder.

Modifications may be made in the forms and proportions. The width of the friction gear-wheels $O^2$ F can be increased or diminished, as may be desired. The annular mass of rubber $F^2$ may be of greater or less diameter or thickness. Parts of the invention may be used without the whole. Instead of rubber, any other elastic material, as twisted wool or hair, may be employed as the parts *j*, to distend the formed leathers when the gland is pressed down.

Some advantages due to certain features of the invention may be separately enumerated as follows:

First. By reason of the fact that the cooler or water-jacket K surrounds the cylinder, as shown, with the regenerator I below it, the zones of low temperature are carried lower in the regenerator, and the upper end of the cylinder is maintained cooler than would be otherwise possible.

Second. By reason of the fact that the cylinder C' forms the side of the water-jacket K, and also that the cooler is traversed by the pipes J, through which the air moves in its passage upward in coming to such cylinder and downward in flowing from it, the water performs the double function of cooling the air in its passages and also of bathing and cooling the cylinder.

Third. By reason of the fact that the changing and working cylinders are arranged concentrically, the one within the other, with the lower end of each communicating directly and freely with the heater, the effect of the changing-cylinder is communicated to the heater and working-cylinder with no appreciable loss in intermediate passages, and I attain this end without making any joints.

Fourth. By reason of the fact that the head of the annular changing-cylinder is formed in one casting with the inner cylinder, C, I save joints, avoid leakage, and add to the strength and stiffness of the construction.

Fifth. By reason of the combination of the governor G and its connections to the cylinder Q with its piston $R^4$ and connections to the rod R′, controlling the link W, the extent of motion of the changing-pistons, and consequently the speed and power of the engine, are automatically regulated.

Sixth. By the continually-acting pumps X′, valve $X^2$, spring $X^3$, and diaphragm $X^4$, the latter influenced, as shown, by the pressure obtaining on the upper faces of the working-pistons, the valve $X^2$ opens automatically to allow air to be taken by the pump when the pressure is below a given point, and closes to prevent air being taken when the pressure reaches and is maintained at the required standard.

Seventh. By the blower U′ forcing air through the pipes U into the ash-pit, and thence through the furnace and escape-passage *a*, the frictional resistance due to the passage of the air through the pipes, and to the passage of the escaping gases from the fire past such pipes, is overcome, an active combustion and consequent efficiency are maintained, combined with provisions for high economy.

Eighth. By means of the perforated pipe *h*, extending around over the changing-piston and connections *h′* to the pump H, with its oil-reservoir H′, the lubricating-fluid can be conveniently introduced and distributed effectively in the upper portion of the annular changing-cylinder.

I have, it will be seen, set forth the invention as an entirety in order that it may be more clearly understood; but I have made the construction and arrangement of the packing described in the foregoing specification and shown in Figs. 1 and 4, the gages described and shown in Figs. 3 and 7, and the gearing also described and shown in Figs. 3, 8, and 9, the subjects of separate applications for patents, and I do not claim these portions of the invention in this application for patent.

I claim as my invention—

1. The annular cooler or water-jacket K, arranged relatively to the cylinder C and to the annular regenerator I, substantially as herein specified.

2. The water-jacket K, with its pipes J arranged as shown, and with suitable water-connections, *k′ k²*, arranged as shown, adapted to perform the double function of cooling the cylinder C′ and of cooling the air in its passage to and from it, as herein specified.

3. In a hot-air engine, the concentric changing and working cylinders, having one end of each opening directly into the heater.

4. In a hot-air engine, the head of the changing-cylinder cast in one piece with the working-cylinder.

5. The link W, and suitable connections for receiving motion from the shaft and imparting it to the changing-piston, in combination with such piston and with the governor G, and with means for automatically shifting the link, as herein specified.

6. In a hot-air engine, the case X*, pipe *x*, and diaphragm $X^4$, in combination with a valve, $X^2$, controlling the admission of air to the air-pump X′, so as to automatically maintain a uniform pressure, as herein specified.

7. In a hot-air engine, the blower U′, air-heating pipes U, furnace A*, and escape-flue *a*, combined and arranged for joint operation as herein specified.

8. In a hot-air engine, the oil-reservoir H′, pump H, and oil-distributing pipe *h*, in combination with each other and with the concentric cylinders C C′ and annular changing-piston E, arranged for joint operation as and for the purpose herein specified.

In testimony whereof I have hereunto set my hand at New York city, New York, in the presence of two subscribing witnesses.

STEPHEN WILCOX.

Witnesses:
M. F. BOYLE,
J. E. RENWEE.